Figure 1:
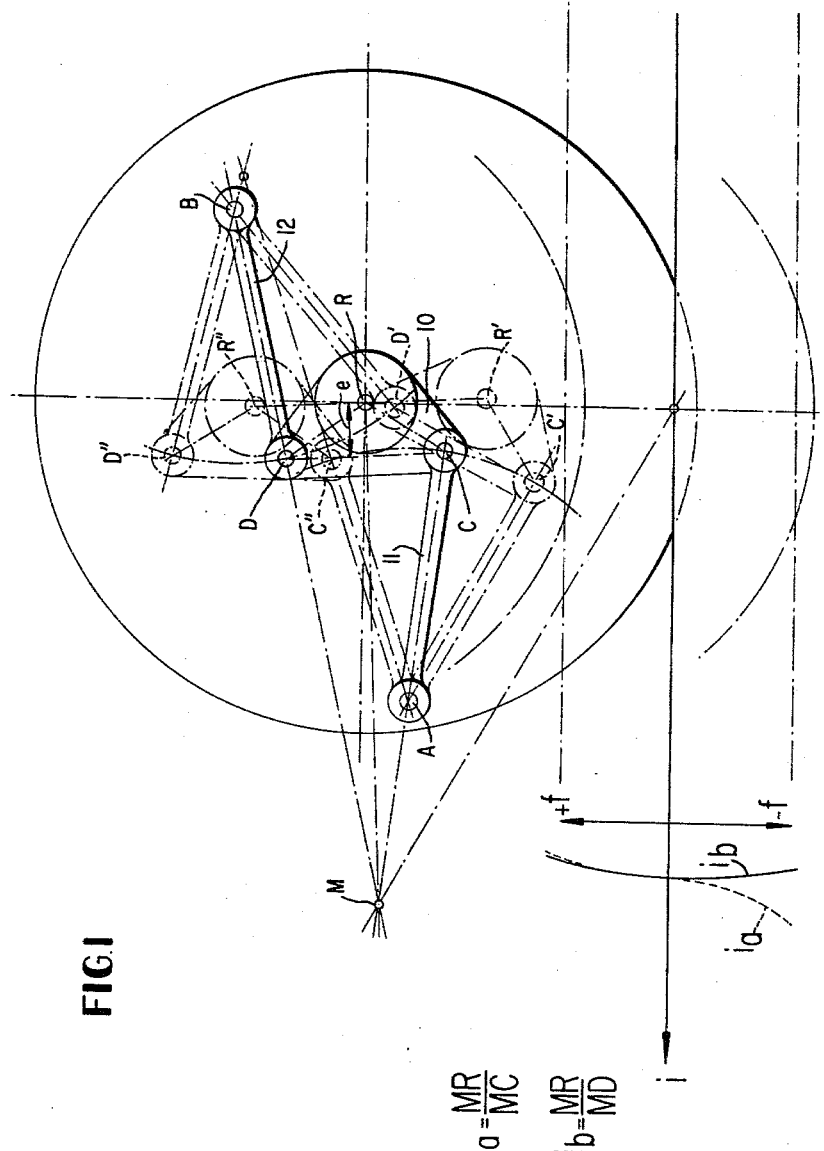

March 23, 1965  A. J. MÜLLER  3,174,771
WHEEL SUSPENSION FOR VEHICLES, ESPECIALLY MOTOR VEHICLES
Filed Nov. 28, 1960  5 Sheets-Sheet 1

$i_a = \dfrac{MR}{MC}$ $i_b = \dfrac{MR}{MD}$

INVENTOR.
ALF JOHN MÜLLER
BY
ATTORNEYS

March 23, 1965     A. J. MÜLLER     3,174,771
WHEEL SUSPENSION FOR VEHICLES, ESPECIALLY MOTOR VEHICLES
Filed Nov. 28, 1960     5 Sheets-Sheet 2

INVENTOR.
ALF JOHN MÜLLER
BY
*Dicke, Craig & Freudenberg*
ATTORNEYS

March 23, 1965  A. J. MÜLLER  3,174,771
WHEEL SUSPENSION FOR VEHICLES, ESPECIALLY MOTOR VEHICLES
Filed Nov. 28, 1960  5 Sheets-Sheet 3

INVENTOR.
ALF JOHN MÜLLER
BY
*Dicke, Craig & Freudenberg*
ATTORNEYS

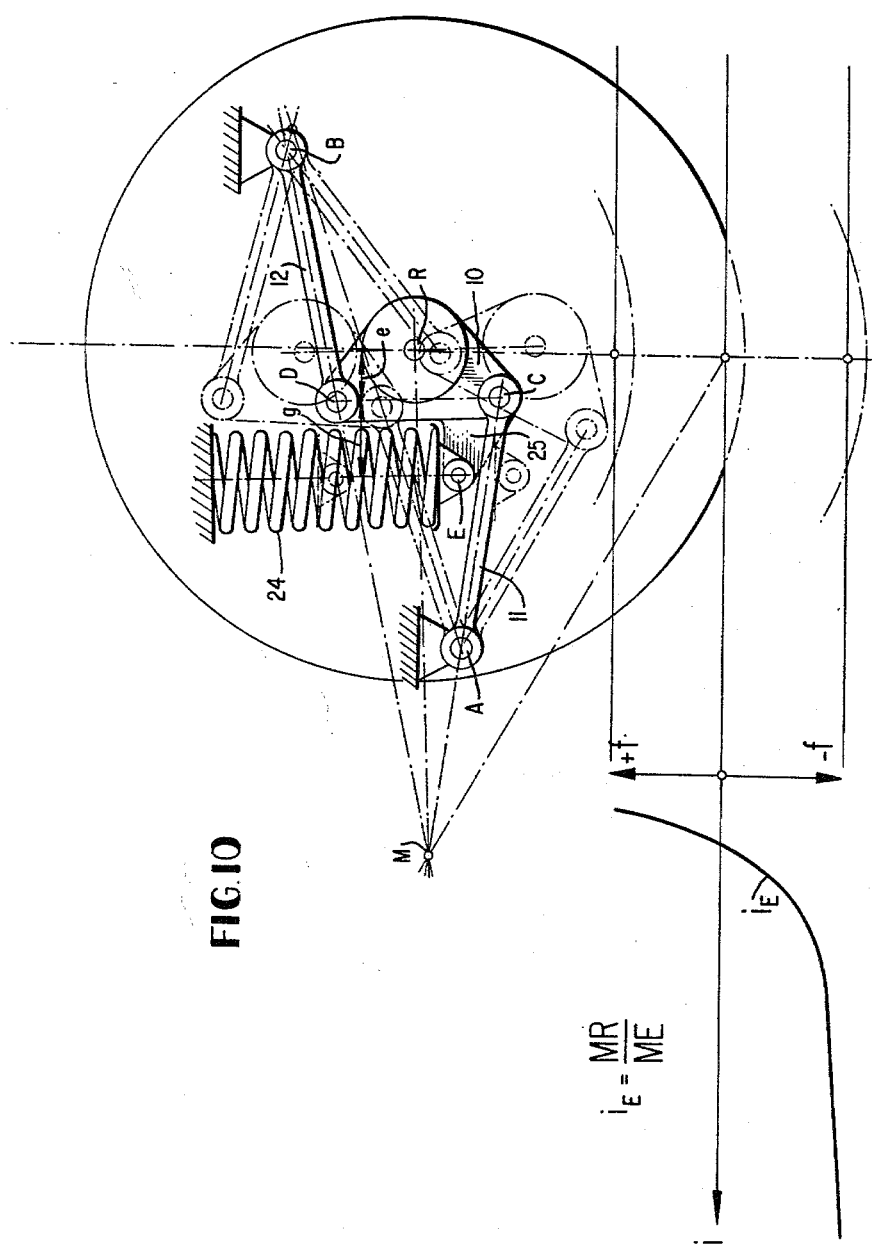

March 23, 1965 A. J. MÜLLER 3,174,771
WHEEL SUSPENSION FOR VEHICLES, ESPECIALLY MOTOR VEHICLES
Filed Nov. 28, 1960 5 Sheets-Sheet 5

INVENTOR.
ALF JOHN MÜLLER
BY
Dicke, Craig & Freudenberg
ATTORNEYS

United States Patent Office 3,174,771
Patented Mar. 23, 1965

3,174,771
WHEEL SUSPENSION FOR VEHICLES,
ESPECIALLY MOTOR VEHICLES
Alf John Müller, Stuttgart-Bad, Germany, assignor to
Daimler-Benz Aktiengesellschaft, Stuttgart-Unterturkheim, Germany
Filed Nov. 28, 1960, Ser. No. 72,102
Claims priority, application Germany, Dec. 4, 1959,
D 32,044
17 Claims. (Cl. 280—124)

The present invention relates to a wheel guidance or wheel suspension for vehicles, especially motor vehicles, with the aid of two longitudinal guide members pivotally secured in places of the wheel carrier disposed at least approximately vertically above one another of which one of the guide members extends forwardly and the other rearwardly in the manner of a Watt-type double swinging assembly.

The present invention essentially consists in that the wheel center is offset with respect to the straight line passing through the pivot points of the longitudinal guide members at the wheel carrier. In this manner, a progressive or degressive characteristic of the vehicle spring system, of the stabilization and of the shock absorption may be obtained with the simplest means. In particular, it is proposed in accordance with the present invention to operatively connect or coordinate the spring to that one of the longitudinal guide members which extends or leads away from the wheel carrier in a direction opposite to the offset of the wheel center. As a result of such an arrangement, there results a spring system which, with a linear characteristic of the spring, properly speaking, is provided with an increasing stiffness with deflection of the wheel in the upward direction. At least one of the longitudinal guide members may be constructed thereby as a spring itself.

However, it is also possible in accordance with the present invention to interpose the spring between the two longitudinal guide members so that the spring engages with the one longitudinal guide member at a place disposed between the pivotal connections thereof at the wheel carrier and at the vehicle frame and with the other longitudinal guide member at an extension passing beyond the pivotal connection thereof at the wheel carrier.

In applying the present invention to a rigid axle construction, it is proposed in accordance therewith that one longitudinal guide member each extending forwardly be pivotally secured at both ends of the rigid axle, offset forwardly and downwardly with respect to the geometric axis of the rigid axle, and that a third rearwardly extending longitudinal guide member be pivotally secured thereto in the center of the rigid axle, especially at the axle gear housing, offset forwardly and downwardly with respect to the geometric axis of the rigid axle.

In contradistinction to the supporting spring system which is to become stiffer with an increasing spring deflection or movement of the wheel, it is desirable in connection with a stabilizer that it is as soft as possible in the center position of the wheel and becomes stiffer progressively from the center position thereof in both directions. According to a further feature of the present invention, such an arrangement may be achieved by coordinating the stabilizer to that one longitudinal guide member which extends from the wheel carrier in the same direction as the offset of the wheel center.

An influence or controlling of the spring characteristic may be achieved according to a further feature of the present invention by providing a spring, effective at least approximately in the vertical direction, which engages at a place of the wheel carrier that is offset with respect to a straight line through the pivot points of the longitudinal guide members at the wheel carrier. Such a measure is effective by itself, however, it may also be used in addition to the offset of the wheel center. Additionally, the offset position of the point of engagement of the compression spring at the wheel carrier offers the advantage that with a spring deflection of the wheel away from the wheel superstructure or frame, the spring is again compressed after passing a certain point and therewith serves as limit of the wheel deflection in the downward direction so that the otherwise usual straps or the like may be completely dispensed with.

It is also proposed in accordance with the present invention, with respect to the position of the longitudinal guide members, and in view of the nodding or nose-diving behavior of the vehicle, that the longitudinal axes of the longitudinal guide members form in the center position thereof an angle, preferably in such a manner that the longitudinal axes thereof approach one another toward the vehicle center. However, the longitudinal guide members may also be provided with pivot axes extending obliquely to the vehicle longitudinal direction as viewed in plan view. Such a construction which is particularly suitable for the front wheels approximates the usual double transverse guide arm arrangement. It is proposed as an overall arrangement at the vehicle that the straight lines, when viewed in a projection onto a vertical vehicle longitudinal plane, which pass through the points of contact with the ground of the front wheel and rear wheel and the points of intersection of the longitudinal axes of the respective longitudinal guide members, intersect or cross each other at least approximately at the height of the center of gravity of the vehicle. As a result of such an arrangement, a vehicle nodding or nose diving during braking or acceleration is far reachingly avoided so that the additional use of this measure in combination with the progressivity of the spring acting in the same direction as a result of the offset of the wheel center with respect to the straight lines through the pivot points of the longitudinal guide members at the wheel carrier is particularly recommendable.

Accordingly, it is an object of the present invention to provide a wheel suspension for vehicle wheels, especially for the wheels of motor vehicles which utilizes longitudinal guide members and provides a progressive spring characteristic of springs, otherwise offering linear characteristics, in a most simple and expedient manner.

It is another object of the present invention to provide a particularly desirable spring characteristic for the wheel suspension of motor vehicle wheels by the use of longitudinal guide members which are so connected with the wheel carrier that the respective wheel center is offset as regards a line connecting the pivot points of the longitudinal guide members at the wheel carrier.

Still another object of the present invention resides in the provision of a wheel suspension utilizing longitudinal guide members which is simple, in construction, easy to assemble and which permits the use of a stabilizer that is progressive as regards the spring characteristics in both directions from the center position thereof.

A still further object of the present invention resides in the provision of a wheel suspension for motor vehicle wheels in which the longitudinal guide members are so connected with the wheel carrier as to obviate the necessity of straps by reason of the fact that the springs are compressed beyond a certain point of the wheel deflection even in that direction of wheel deflection which at first might give rise to a reduction of the spring force.

Figure 2:
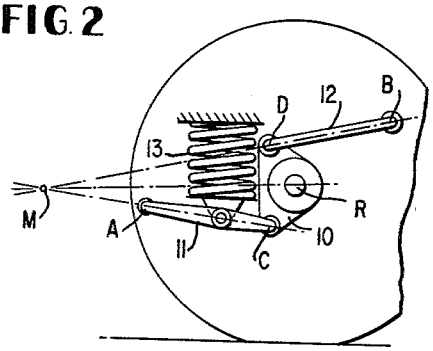
Figure 3:
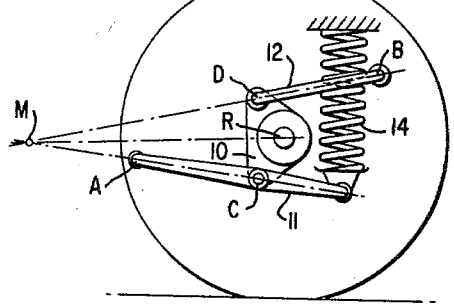
Figure 4:
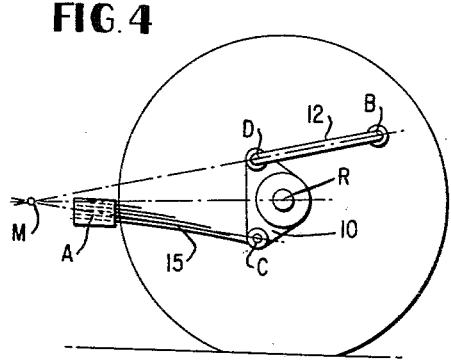
Figure 5:
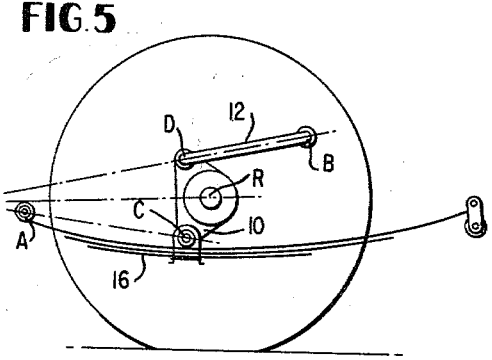
Figure 6:
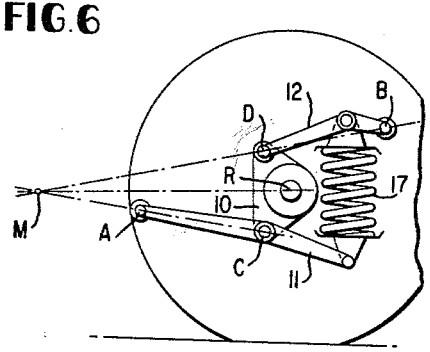
Figure 7:
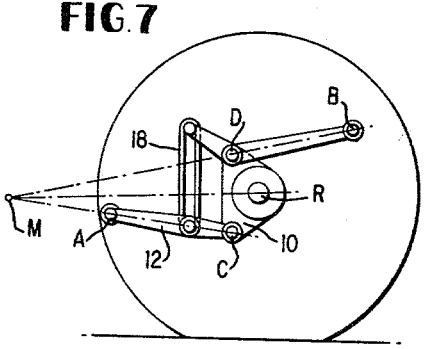
Figure 9:
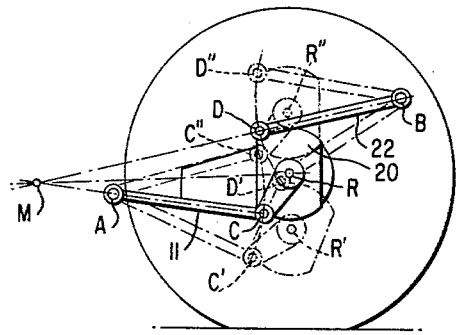
Figure 8:
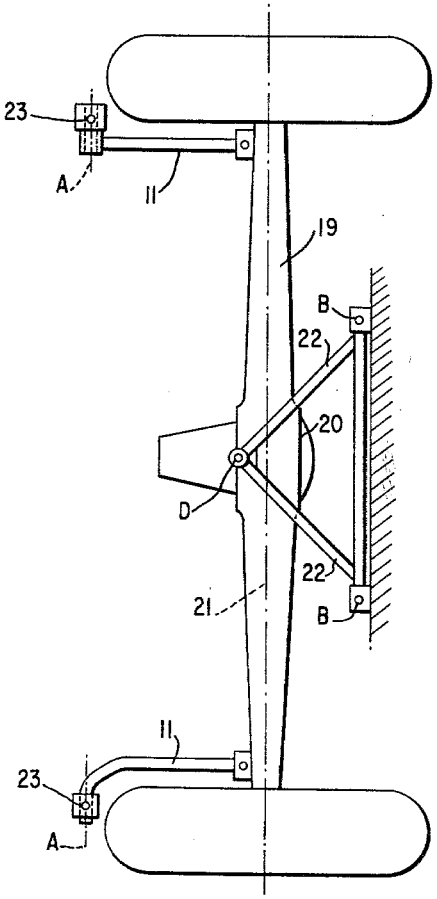
Figure 11:
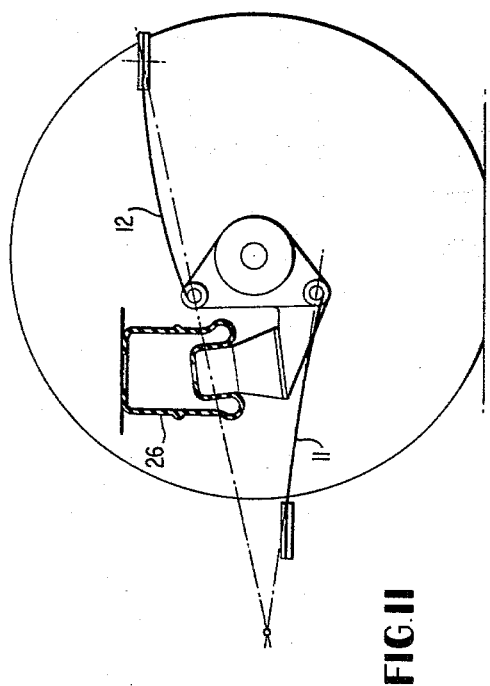
Figure 12:
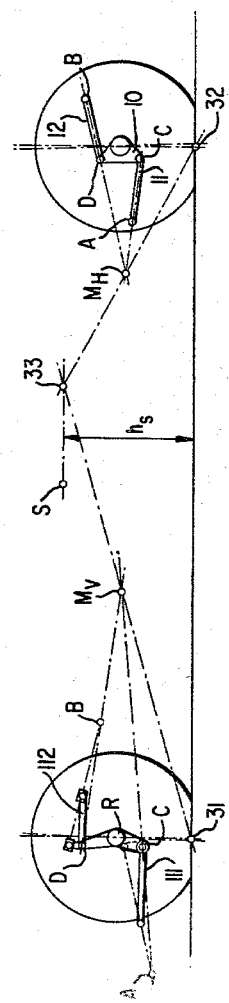
Figure 13:
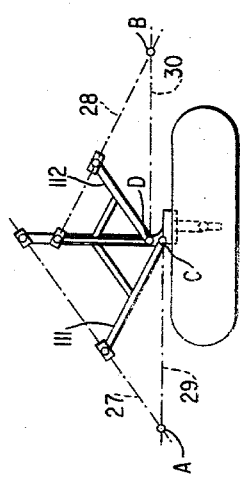

These and other objects, features and advantages of the present invention will become more obvious from the following description when taken in connection with the accompanying drawing which shows, for purposes of illustration only, several embodiments in accordance with the present invention, and wherein FIGURE 1 is a schematic side elevational view of a wheel suspension illustrating the basic principles in accordance with the present invention by reference to three positions of the wheel suspension and a diagram of the translation ratios obtained therewith, FIGURES 2 and 3 illustrate, in side elevational view, two embodiments in accordance with the present invention in which compression springs are inserted between the lower guide member and the vehicle superstructure, FIGURES 4 and 5 are side elevational views of two further modified embodiments in accordance with the present invention in which the lower guide members are constructed as leaf springs, FIGURES 6 and 7 illustrate embodiments, in side elevational view, in which the springs are interposed between both guide members whereby in FIGURE 6 a compression spring is used and in FIGURE 7 a draw spring, FIGURE 8 is a top plan view of a wheel suspension in accordance with the present invention as applied to a rigid axle construction, FIGURE 9 is a side elevational view of the wheel suspension of FIGURE 8, FIGURE 10 is a side elevational view illustrating a wheel suspension in accordance with the present invention in which a coil spring is mounted on the wheel carrier itself, FIGURE 11 is a side elevational view of a modified embodiment of a wheel suspension in accordance with the present invention, similar to that of FIGURE 10, in which a pneumatic spring is used, FIGURE 12 illustrates a schematic side elevational view of a wheel suspension in accordance with the present invention for the front and rear wheels of a motor vehicle, and FIGURE 13 illustrates a top plan view of a front wheel suspension according to FIGURE 12.

Referring now to the drawing wherein like reference numerals are used throughout the various views to designate corresponding parts, and more particularly to FIGURE 1, reference numeral 10 designates therein the wheel carrier on which is mounted, in any suitable manner a vehicle wheel indicated only schematically by the circle which has a wheel center the position of which is designated in FIGURE 1 by reference character R in the normal wheel position thereof. A lower longitudinal guide member 11 is pivotally secured at the wheel carrier 10 at a point C which lower longitudinal guide member 11 is also pivotally secured at the vehicle superstructure such as the frame or the vehicle body, especially of a self-supporting type body construction at the point A. The upper longitudinal guide member 12 is pivotally secured at the wheel carrier at point D and at the vehicle superstructure at point B. The term vehicle superstructure is used in the specification and claims herein to refer to a relatively fixed part of the vehicle, such as the frame, the chassis frame or vehicle body of a self-supporting type body construction.

Three positions of the wheel suspension are shown in FIGURE 1 of the drawing whereby the center position thereof is indicated in heavy lines and the two other positions corresponding to the largest or maximum deflections of the wheel in both directions are illustrated in dot-and-dash lines.

The instantaneous center of rotation for the movements of the wheel carrier 10 in the full-line center position thereof is determined by the point of intersection of the straight lines AC and BD. This center of rotation or so-called instantaneous center M, thus obtained, is located with each wheel deflection of the wheel in a different place.

It is of importance in connection with the accommodation of the vehicle support springs, of the stabilizer and/or of the shock absorbers to know how the points C and D move in relation to the wheel center R during deflection movements of the wheel. Consequently, the translating or transmission ratios $$i_a = \frac{MR}{MC} \text{ and } i_b = \frac{MR}{MD}$$

are of real interest. The two translating or transmission ratios $i_a$ and $i_b$ are plotted in dependence on the wheel stroke in the diagram to the left and below FIGURE 1. As may be readily seen from this diagram, the translating or transmission ratio $i_a$ for the point C, departing from the lowermost position of the wheel, decreases continuously, or otherwise stated, with equal stroke movements of the wheel R, the point C traverses progressively larger paths which corresponds to a progressive spring characteristic insofar as a spring is though of as engaging at the point C. Additionally, it may be seen from the illustration of the wheel suspension in the three indicated positions thereof that with approximately equal stroke deflection sections of the point R, from point R' via point R to point R'', the point C traverses increasingly larger paths from point C' via point C to point C''. The conditions with point D, however, are different. In connection with this point D, the translation or transmission ratio is largest in the center position thereof and decreases toward both end positions thereof.

Departing from the basic arrangement in principle of FIGURE 1, arrangements are illustrated in FIGURES 2 and 3 with compression springs in which the effect of the springs 13 and 14, respectively, takes place through guide member 11 on the point C. The compression springs 13 and 14 may also engage the lower longitudinal guide member 11 either at a point intermediate points A and C (FIG. 2) or also beyond the region between points A and C as illustrated in FIGURE 3.

In the constructions according to FIGURES 4 and 5, the lower longitudinal guide members 15 and 16, respectively, are constructed themselves as springs, and more particularly as leaf springs. Again, the springs in both of these embodiments are effective or act at point C of the wheel carrier 10 so that, exactly as in the arrangements of FIGURES 2 and 3, a progressive spring characteristic will be obtained.

It is also possible to interpose the springs between the longitudinal guide members 11 and 12 and more particularly in the form of a compression spring 17 (FIGURE 6) as well as in the form of a draw-spring 18 (FIGURE 7).

A rigid axle construction provided with a rigid axle 19 is shown in FIGURES 8 and 9 which carries in the center thereof an axle gear housing 20. A longitudinal guide member 22 constructed as a triangular guide member is connected for universal movement at the top of the axle gear housing 20, and more particularily offset forwardly as at D with respect to the geometric axis 21 of the rigid axle 19. The upper longitudinal guide member 22 is also pivotally secured at the vehicle superstructure at point B. The lower longitudinal guide members 11 are present in pairs, one guide member 11 each in proximity to a respective wheel, whereby two different constructions are shown in FIGURE 8 for the pivotal connection of the lower guide members 11 at the vehicle superstructure. It is, however, understood that normally the same one of the two illustrated types of connections is used in a particular vehicle. However, it is also noted that in both cases the guide members 11 are capable of pivoting or rotating about an axis A extending in the vehicle transverse direction. Additionally, there is provided the possibility of pivot movement about a vertical axis 23 which is necessary in order to enable yielding to the small transverse movement of the spring-deflecting wheel relative to the vehicle superstructure that occurs during unilateral spring deflections of the wheels.

In the embodiment of FIGURE 10, a compression spring 24 is supported, on the one hand, against the vehicle superstructure and, on the other, at point E against a projection 25 arranged at the wheel carrier 10. Such a support which utilizes a distance $g$ from the straight line DC, acts in an enhancing manner to the effect of the offset of the wheel center R corresponding to distance $e$ in a sense of a more pronounced progression of the spring characteristics of the spring as may be readily recognized also from the diagram arranged below and toward the left of FIGURE 1 for the magnitude of the translation or transmission $$i_\mathrm{E} = \frac{MR}{ME}$$

FIGURE 11 illustrates a similar construction to that FIGURE 10 with a pneumatic spring bellows 26 in the place of the coil spring 24. Additionally, in this embodiment, the guide members 11 and 12 are also constructed in a springy manner.

With an application of the present invention to both the front and rear axles of a motor vehicle, an arrangement is recommended in accordance with the present invention as illustrated in FIGURES 12 and 13. The rear wheel suspension corresponds to any one of the embodiments discussed so far hereinabove whereby the pivot axis of the guide members 11 and 12 extend essentially in the vehicle's transverse direction.

However, with the front axle, the longitudinal guide members 111 and 112 are constructed as triangular guide members which are provided with obliquely extending pivot axes 27 and 28. The points A and B are determinative for the effect of the guide members 111 and 112 in the longitudinal direction which points A and B are located in that place where the pivot axes 27 and 28 intersect the vertical longitudinal planes 29 and 30 which pass through the points C and D. Just as the instantaneous center $M_H$ for the swinging movement of the wheel carrier 10 of the rear axle may be found as point of intersection of the longitudinal axes of the guide members 11 and 12, the instantaneous center $M_V$ for the front wheel may be found as the point of intersection of the straight lines AC and BD. A far-reaching reduction of the nodding or nose-diving movements of the vehicle during braking or acceleration can be realized not only as the result of the offset $e$ of the wheel center, and also as a result of the offset $g$ of the point of engagement of the respective spring, but additionally also by the fact that the straight lines passing through the point of contact 31 and 32 of the wheels with the road surface and the respective instantaneous centers $M_V$ and $M_H$ intersect in a point 33 which is located at the same height $h_S$ above the road surface as the center of gravity S of the vehicle.

While I have shown and described several embodiments in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. In a wheel suspension for vehicles, especially for motor vehicles, provided with a vehicle superstructure and having at least one wheel adapted to perform spring movements and wheel carrier means for said wheel, the improvement consisting essentially of an improved guiding means for said wheel for guiding the same during said spring movements through a deflection path extending essentially along a straight line approximately vertical with respect to the plane of the road surface, comprising longitudinal guide means extending essentially in the forward and in the rearward direction respectively from said wheel carrier means and secured to said superstructure, said forwardly and rearwardly extending longitudinal guide means each being pivotally secured at said wheel carrier in places disposed essentially one above the other within a vertical transverse plane of the vehicle, the wheel center being offset with respect to a straight line passing through the pivot points of said forwardly and rearwardly extending longitudinal guide means at said wheel carrier means in the direction of the guide means secured uppermost on said wheel carrier, and spring means applying a suspension spring force to said wheel carrier at a point offset longitudinally from the wheel center.

2. In a wheel suspension for vehicles, especially motor vehicles, provided with a vehicle superstructure and having a pair of wheels adapted to perform spring movements and rigid axle means for supporting said wheels, the improvements consisting essentially of an improved guiding means for said wheels for guiding same during said spring movements through a deflection path extending essentially within a transverse vehicle plane approximately vertical with respect to the plane of the road surface comprising longitudinal guide means at each end of said rigid axle means extending in one longitudinal direction of the vehicle and pivotally secured to said axle means at a point offset with respect to the geometric axis of said axle means in one longitudinal and one vertical direction, and further longitudinal guide means pivotally secured to said axle means essentially in the transverse center thereof and extending in the opposite longitudinal direction from said first-mentioned longitudinal guide means, said further longitudinal guide means being pivotally secured to said axle means at a point offset with respect to the geometric axis of the axle means in the same longitudinal direction as said first-mentioned longitudinal guide means and in the opposite vertical direction as compared to said first-mentioned longitudinal guide means, said pivot points for said guide means on said axle means falling essentially within the same transverse vertical plane of the vehicle, said first-mentioned and said further longitudinal guide means being operatively secured to said vehicle superstructure at the ends thereof opposite to said rigid axle means and said axle means being offset from the transverse vertical plane of said pivot points in the same longitudinal direction as the uppermost guide, and spring means coordinated to that longitudinal guide means which extends away from said axle means in a direction opposite to the offset of the geometric axis of said axle means.

3. A wheel suspension for the rigid axle of a vehicle, especially a motor vehicle, provided with a vehicle superstructure and a plurality of wheels adapted to perform vertical movements, comprising rigid axle means adapted to support said wheels and means for guiding said wheels during the movements thereof through a deflection path extending essentially within a vehicle transverse plane extending approximately vertical with respect to the plane of the road surface comprising longitudinal guide means operatively secured at each end of said axle means, said longitudinal guide means extending in the forward direction of said vehicle, the point of connection of said guide means at said axle means being offset forwardly and downwardly with respect to the geometric axis of said axle means, and further longitudinal guide means pivotally secured to said axle means essentially in the transverse center thereof and extending in the rearward direction of said vehicle, the pivot point for said further longitudinal guide means being offset forwardly and upwardly with respect to the geometric axis of said axle means, whereby the straight line passing through the pivot point of said further longitudinal guide means and the point at which said first-mentioned longitudinal guide means is operatively secured to said rigid axle means is offset forwardly with respect to the line passing through the centers of said wheels, said pivot points for said guide means on said axle means falling essentially within a transverse vertical plane of the vehicle, and spring means coordinated to that longitudinal guide means which extends away from said axle means in a direction opposite to the offset of the wheel center.

4. A wheel suspension for the rigid axle of a vehicle according to claim 3, wherein said axle means includes an axle gear housing, and wherein said further longitudinal guide means is pivotally secured at said axle gear housing.

5. A wheel suspension for the rigid axle of a vehicle according to claim 3, wherein three longitudinal guide means are provided, one longitudinal guide means each at a respective outer end of said rigid axle means, and a third longitudinal guide means connected essentially in the center of said axle means, each of said longitudinal guide means being pivotally secured to said axle means and said vehicle superstructure.

6. A wheel suspension for vehicles, especially for motor vehicles, provided with a vehicle superstructure, a pair of wheels adapted to perform spring movements, rigid axle means, and wheel carrier means secured to said rigid axle means for carrying said wheels, the improvement consisting essentially of an improved guiding means for said wheels for guiding the same during said spring movements through a deflection path within a vehicle transverse plane extending through the wheel centers and approximately vertical with respect to the plane of the road surface, comprising a plurality of longitudinal guide members pivotally secured at said wheel carrier means respectively at points disposed approximately one above the other within a vertical transverse plane of the vehicle, said plurality of longitudinal guide members including a pair of guide members extending in the forward direction of the vehicle and at least one further longitudinal guide member extending in a rearward direction thereof, said forwardly and rearwardly directed guide members being operatively secured to said vehicle superstructure at the ends thereof opposite to said wheel carrier means, the pivot points at said wheel carrier means for each of said longitudinal guide members being arranged forwardly of the wheel centers with respect to the vehicle longitudinal direction whereby the center of the wheel at said carrier means is offset with respect to a straight line passing through the pivot points of said longitudianl guide members at said wheel carrier means in the direction of the guide means secured uppermost on said wheel carrier means, and spring means coordinated to that longitudinal guide means which extends away from said wheel carrier means in a direction opposite to the offset of the wheel center.

7. A wheel suspension for vehicles according to claim 6, wherein the longitudinal axes of said longitudinal guide members form an angle with respect to each other when said wheels are in the center position of the deflection path thereof.

8. In a wheel suspension for vehicles, especially for motor vehicles, provided with a vehicle superstructure and having at least one wheel adapted to perform spring movements and wheel carrier means for said wheel, the improvement consisting essentially of an improved guiding means for said wheel for guiding the same during said spring movements through a deflection path extending essentially along a straight line approximately vertical with respect to the plane of the road surface, comprising longitudinal guide means extending essentially in the forward and in the rearward direction respectively from said wheel carrier means and secured to said superstructure, said forwardly and rearwardly extending longitudinal guide means each being pivotally secured at said wheel carrier in places disposed essentially one above the other within a vertical transverse plane of the vehicle, and the wheel center being offset with respect to a straight line passing through the pivot points of said forwardly and rearwardly extending longitudinal guide means at said wheel carrier means, said longitudinal guide means being provided effectively with pivot axes extending obliquely to the vehicle longitudinal direction as viewed in plan view, said vehicle including front and rear wheels, and the straight lines, as viewed in projection onto a vertical vehicle longitudinal plane, which pass through the contact points of the front and rear wheels with the road surface and the points of intersection of the axes of said longitudinal guide means intersecting one another at least approximately at the height of the center of gravity of the vehicle.

9. A wheel suspension for vehicles, especially for motor vehicles, provided with a vehicle superstructure, a pair of wheels adapted to perform spring movements, rigid axle means, and wheel carrier means secured to said rigid axle means for carrying said wheels, the improvement consisting essentially of an improved guiding means for said wheels for guiding the same during said spring movements through a deflection path within a vehicle transverse plane extending through the wheel centers and approximately vertical with respect to the plane of the road surface, comprising a plurality of longitudinal guide members pivotally secured at said wheel carrier means respectively in places disposed approximately one above the other within a vertical transverse plane of the vehicle, said plurality of longitudinal guide members including a pair of guide members extending in the forward direction of the vehicle and at least one further longitudinal guide member extending in a rearward direction thereof, said forwardly and rearwardly directed guide members being operatively secured to said vehicle superstructure at the ends thereof opposite to said wheel carrier means, the pivot points at said wheel carrier means for each of said longitudinal guide members being arranged forwardly of the wheel centers with respect to the vehicle longitudinal direction whereby the center of the wheel at said carrier means is offset rearwardly with respect to a straight line passing through the pivot points of said longitudinal guide members at said wheel carrier means, the longitudinal axes of the longitudinal guide members of a respective wheel suspension intersecting each other in a respective point of intersection, and the lines passing through the contact point of a respective wheel with the road surface and the corresponding point of intersection of the longitudinal axes of the corresponding guide members crossing each other, as viewed in projection onto a vehicle longitudinal plane, at least approximately at the height of the center of gravity of the vehicle.

10. In a wheel suspension for vehicles, especially for motor vehicles, provided with a vehicle superstructure and having at least one wheel adapted to perform spring movements and wheel carrier means for said wheel, the improvement consisting essentially of an improved guiding means for said wheel for guiding the same during said spring movements through a deflection path extending essentially along a straight line approximately vertical with respect to the plane of the road surface, comprising longitudinal guide means extending essentially in the forward and in the rearward direction respectively from said wheel carrier means and secured to said superstructure, said forwardly and rearwardly extending longitudinal guide means each being pivotally secured at said wheel carrier in places disposed essentially one above the other within a vertical transverse plane of the vehicle, and the wheel center being offset with respect to a straight line passing through the pivot points of said forwardly and rearwardly extending longitudinal guide means at said wheel carrier means, one of the longitudinal guide means including an extension lying beyond the pivot point thereof at the wheel carrier on the side of said carrier opposite to the point at which said one longitudinal guide means is secured to said superstructure, and spring means engaging with the other of the longitudinal guide means at a point intermediate the pivotal connection thereof at said wheel carrier means and said vehicle superstructure and with said one longitudinal guide means at a point lying on said extension beyond the pivot point at the wheel carrier means.

11. In a wheel suspension for vehicles, especially for motor vehicles, provided with a vehicle superstructure and having at least one wheel adapted to perform spring movements and wheel carrier means for said wheel, the improvement consisting essentially of an improved guiding means for said wheel for guiding the same during said spring movements through a deflection path extending essentially along a straight line approximately vertical with respect to the plane of the road surface, comprising longitudinal guide means extending essentially in the forward and in the rearward direction, respectively, from said wheel carrier means and secured to said superstructure, said forwardly and rearwardly extending longitudinal guide means each being pivotally secured at said wheel carrier in places disposed essentially one above the other within a vertical transverse plane of the vehicle, the wheel center being offset with respect to a straight line passing through the pivot points of said forwardly and rearwardly extending longitudinal guide means at said wheel carrier means in the direction of the guide means secured uppermost on said wheel carrier, and spring means coordinated to that longitudinal guide means which extends away from said wheel carrier means in a direction opposite to the offset of the wheel center.

12. A wheel suspension for vehicles according to claim 11, wherein at least one of said longitudinal guide means is constructed itself as a spring.

13. A wheel suspension for vehicles according to claim 11, further comprising stabilizer means operatively connected with that longitudinal guide means which extends away from said wheel carrier means in the same direction with respect to the offset of the wheel center.

14. A wheel suspension for vehicles according to claim 11, wherein the longitudinal axes of said longitudinal guide means subtend an angle therebetween when said wheels are in the respective center positions of the deflection path thereof in such a manner that the longitudinal axes approach one another toward the vehicle center.

15. A wheel suspension for vehicles according to claim 11, wherein said longitudinal guide means are provided effectively with pivot axes extending obliquely to the vehicle longitudinal direction as viewed in plan view.

16. A wheel suspension for vehicles, especially motor vehicles, provided with a vehicle superstructure, a pair of wheels adapted to perform spring movements, axle means, and wheel carrier means secured to said axle means for carrying said wheels, the improvement consisting essentially of an improved guiding means for said wheels for guiding the same during said spring movements through a deflection path within a vehicle transverse plane extending through the wheel centers and approximately vertical with respect to the plane of the road surface, comprising a plurality of longitudinal guide members pivotally secured at said wheel carrier means, respectively, at points disposed approximately one above the other within a vertical transverse plane of the vehicle, said plurality of longitudinal guide members including a pair of guide members extending in the forward direction of the vehicle and at least one further longitudinal guide member extending in a rearward direction thereof, said forwardly and rearwardly directed guide members being operatively secured to said vehicle superstructure at the ends thereof opposite to said wheel carrier means, the pivot points at said wheel carrier means for each of said longitudinal guide members being arranged forwardly of the wheel centers with respect to the vehicle longitudinal direction whereby the center of the wheel at said carrier means is offset with respect to a straight line passing through the pivot points of said longitudinal guide members at said wheel carrier means in the direction of the guide means secured uppermost on said wheel carrier means, and spring means acting in at least an approximately vertical direction, said spring means engaging effectively at a place on a longitudinal guide member which is offset with respect to the straight line passing through the pivot points on said longitudinal guide members at said wheel carrier means.

17. A wheel suspension for vehicles according to claim 16, wherein said place of engagement of said spring means on said longitudinal guide member is offset in a direction opposite to the offset of the wheel center.

References Cited in the file of this patent
UNITED STATES PATENTS

| | | |
|---|---|---|
| 2,179,016 | Leighton | Nov. 7, 1939 |
| 2,226,047 | Borgward | Dec. 24, 1940 |
| 2,300,844 | Olley | Nov. 3, 1942 |
| 2,746,766 | Nallinger | May 22, 1956 |
| 2,919,760 | Fehlberg | Jan. 5, 1960 |